United States Patent [19]
Anderson

[11] 3,716,384
[45] Feb. 13, 1973

[54] COMPOSITIONS FOR SEALING LEAKS IN VESSELS

[75] Inventor: Amos R. Anderson, Adrian, Mich.

[73] Assignee: Joseph J. Packo

[22] Filed: May 12, 1971

[21] Appl. No.: 142,795

Related U.S. Application Data

[62] Division of Ser. No. 7,210, Jan. 30, 1970, Pat. No. 3,634,560.

[52] U.S. Cl. ..........106/33, 106/287 R, 106/287 SE, 106/287 SB, 117/2, 117/107.2, 117/135.1, 252/305, 252/372, 260/448, 260/448.8
[51] Int. Cl. .............................C09k 3/10, C09k 3/12
[58] Field of Search ..106/33, 287 B, 287 C; 148/6.3; 260/448, 448.2, 448.8, 29.2 M; 252/431 R, 305, 372; 117/107, 2 R, 2, 135.1

[56] References Cited

UNITED STATES PATENTS

| | | | |
|---|---|---|---|
| 3,551,341 | 12/1970 | Lehiboinen | 252/305 X |
| 3,491,054 | 1/1970 | Thomas | 117/135.1 |

FOREIGN PATENTS OR APPLICATIONS

| | | | |
|---|---|---|---|
| 226,222 | 12/1959 | Australia | 260/448 A |

Primary Examiner—Joan B. Evans
Attorney—Hugo E. Weisberger

[57] ABSTRACT

The invention relates to compositions for sealing leaks in pipes, conduits, gas lines, closed containers, tanks and the like. The interior of such equipment is first purged with a non-reactive dry gas, such as nitrogen, to remove any moisture and/or oxygen which may be present. Then the sealant composition is introduced into the interior of the equipment in a suitable inert gas vehicle under pressure. The sealant composition in the gas vehicle will escape from any leaks present in the equipment into the adjacent external environment such as the outer ambient atmosphere or adjacent soil in the case of pipelines buried in soil. The sealant reacts with oxygen and/or moisture to form at the situs of the leak a solid reaction product.

The sealant compositions comprise pyrophoric volatilizable alkyl aluminum etherates. Illustrative examples are trimethylaluminum dimethyletherate, trimethylaluminum diethyletherate, and triethylalumin diethyletherate. These and similar compounds may be used singly or in mixtures thereof. They may also be mixed with volatile organo-silane compounds in amounts ranging from about 1 to 99 percent by volume. Specific illustrative organo-silane compounds are trimethyl ethoxy silane, dimethyl diethoxy silane, and propyl trimethoxy silane.

4 Claims, No Drawings

COMPOSITIONS FOR SEALING LEAKS IN VESSELS

CROSS-REFERENCE TO RELATED APPLICATION

This application is a division of copending application Ser. No. 7,210, filed Jan. 30, 1970 now U.S. Pat. No. 3,634,560.

FIELD OF THE INVENTION

This invention relates to sealing leaks in pipes, conduits, closed containers, tanks, and closed systems adapted to contain fluids therein, hereinafter referred to generally as "vessel." The invention is particularly adapted for sealing leaks in buried underground piping systems used for conveying fuel gas and also for sealing leaks in telephone and electrical conduits containing nitrogen or other inert gas under pressure.

SUMMARY OF THE INVENTION

According to this invention the interior of the vessel is first purged with a dry non-reactive gas, such as nitrogen, to remove moisture and/or oxygen present. The sealant composition is then introduced into the interior of the vessel under pressure in gaseous form or in a suitable inert gaseous vehicle. When the sealant composition escapes through any existing leak in the vessel it reacts with oxygen and moisture present at the exterior or locus of the vessel where the leak exists and forms a solid product in situ which seals the leak. The sealant compositions consist essentially of pyrophoric volatilizable alkyl aluminum etherates compounds. These sealant compositions are introduced in the vessel in a nonreactive vehicle gas, such as hydrogen, helium or nitrogen, in an amount so that upon escape of the admixed gas from a leak into adjacent external environment containing moisture and oxygen, such as for example the adjacent soil of a buried pipeline, a seal will be produced. These sealant agents are substances which are easily volatilized and which can be admixed with the inert vehicle gas and carried along with the gas in the vessel.

The sealant compositions comprise pyrophoric volatilizable alkyl aluminum alkyl etherates. Illustrative compounds are:

Trimethylaluminum dimethyletherate, $(CH_3)_3Al \cdot O(CH_3)_2$

Trimethylaluminum diethyletherate, $(CH_3)_3Al \cdot O(C_2H_5)_2$

Triethylaluminum diethyletherate, $(C_2H_5)_3Al \cdot O(C_2H_5)_2$

Tri-n-propylaluminum diethyletherate, $(C_3H_7)_3Al \cdot O(C_2H_5)_2$

Tri-i-butylaluminum diethyletherate, $(C_4H_9)_3Al \cdot O(C_2H_5)_2$

These and similar compounds may be used singly or in mixtures thereof. Other known pyrophoric volatilizable alkyl aluminum etherates having one to four carbon atoms in the alkyl group may be readily selected by a person skilled in the art.

The alkyl aluminum etherate compounds may be mixed if desired with selected volatilizable organo-silane compounds which have the formula: $R_{4-n}Si(OR')_{n'}$ wherein R and R' is a straight or branched chain alkyl having one to four carbon atoms, all the alkyls being identical or different, and $n$ and $n'$ is an integer from 1 to 4. Specific examples are trimethyl ethoxy silane, dimethyl diethoxy silane, propyl trimethoxy silane, isopropyl trimethoxy silane, butyl triethoxy silane, diisopropoxy dimethoxy silane and tetraethoxy silane. These volatile silanes may be admixed singly or in mixtures thereof with the volatile alkyl aluminum etherate compounds previously described.

The proportions of the volatile alkyl aluminum etherate compounds and volatile organo-silanes may be varied over a wide range depending upon the partial vapor pressures of the specific volatilized components. In general, the proportions of the alkyl aluminum etherate compound may range from about 1 percent to about 99 percent by volume, the remainder being the organo-silane compound. It is preferred to keep the alkyl aluminum etherate concentration below 30 percent by volume in the sealant composition, although higher concentrations may be used, keeping in mind that such higher concentrations may result in pyrophoric compositions which are difficult to handle. Furthermore, inasmuch as the organo-silanes are generally less volatile than the alkyl aluminum etherate compounds, a greater quantity of the organo-silanes will result in a more even distribution in the vessel or the pipeline of the components of the sealant composition due to differences in their vapor pressures. The sealant compositions are not simple mixtures of the alkyl aluminum etherate compounds but in many cases may undergo complex interchange reactions. When such products as well as any of the original components escape from a leak they will react with oxygen or moisture present at the situs of the leak to form complex solid reaction products that seal the leak. Also in the case of vessels or pipelines buried in the soil the escaping sealant compositions will react with the oxygen or moisture present in the soil at the external situs of the leak and form a solid seal while at the same time the soil adjacent the solid seal will provide a matrix or reinforcement for the seal.

The concentration of the volatile sealant compositions used and the pressure of the vehicle gas used may be varied over a wide range depending upon the specific components used, the nature and size of the leaks which are to be sealed and the environmental conditions of the particular vessel and the like. The time of flow of the sealant composition can also be greatly varied accordingly in order to seal existing leaks.

These sealant agents may be added to vehicle gases in concentrations ranging from about 0.005 to about 10 percent by weight in the vehicle gases. They may also be conveniently added in solutions of suitable hydrocarbons, such as butane, hexane, heptane, etc. which will uniformly volatilize or disperse in the vehicle gas. When the admixed gases escape into the atmosphere they produce in situ a solid seal.

If desired, the sealant compositions may be supplied to the user in containers or cylinders mixed in the proportions required for specific sealing operations. The compositions may be introduced into the vessel and the like by suitable means in controlled or metered amounts in the vessel which has been previously flushed and dried with an inert gas. The inert gas and the added sealant composition are maintained at a suitable pressure for a sufficient period of time to seal any leak present. Also if desired, the user may be supplied with a suitable container having under pressure an inert gas and the selected sealant agents mixed therein in suitable proportions which can be introduced directly into the vessel and the like. Also if desired, the specific components of the sealant composition can be introduced in volatilized condition separately in controlled amounts in the vessel and the like in which the inert gas is present under suitable pressure.

ILLUSTRATIVE EMBODIMENTS OF THE INVENTION

The following are illustrative procedures for producing seals, utilizing the compositions of the invention.

EXAMPLE 1

A steel pipe section (7 feet long, ¾ inch diameter) drilled with a ⅛ inch hole to simulate a leak is buried under 30 inches of clay loan soil of 6 percent moisture content. One end of the pipe is connected to a valve-controlled feed line connected to a source of dry nitrogen gas for purging the pipe of any moisture or oxygen, and also as an inert gas carrier for the sealant composition. The nitrogen line is also connected to a bubbler vessel containing the liquid sealant composition. Pressure and flow indicators and monitors are also connected in the feed line. The other end of the test pipe is connected to a valved outlet line connected to a pressure gage and pressure recorder. The test pipe is first purged with a stream of dry nitrogen gas to remove oxygen and moisture. Liquid trimethylaluminum dimethyletherate is placed in a bubbler and nitrogen gas passed through the liquid, at ambient temperatures at a pressure of 1 psig. The nitrogen gas, carrying the volatilized trimethylaluminum dimethyletherate vapors is passed into the test pipe until a seal is obtained. An effective seal can be made after a 72 hour period in which the initial flow rate is 50 C.F.H. at 1 lb. psig. Pressure is kept constant and flow rate decreased as sealing takes place.

EXAMPLE 2

A mixture of 20 percent trimethylaluminum diethyletherate and 80 percent dimethyl diethoxy silane, by volume, is placed in the apparatus described above in Example 1 and nitrogen gas is passed through the solution for a period of 200 hours. At the end of this period a seal is obtained which shows no leakage at 100 lbs. psig over a 24 hour period as indicated via the flow meter.

ADVANTAGES

The present invention is particularly suitable for sealing leaks caused by corrosion in pipelines buried in the soil as well as in the joints. In cases where bell and spigot joints for example are packed with caulked jute or other fibrous materials they tend to dry out and cause leaks especially when the pipelines are used to convey natural fuel gas which is extremely dry. Fuel gas lines buried underground in cities are also subjected to earth heaving and vibration caused by vehicles and trucks of the street traffic which produce leaks at the joints. The repair of such leaks is very costly because sections of the gas main must be exposed by excavating the superposed soil to gain access to the leaking joints for resealing them. According to the present invention excavations are entirely eliminated. The section of the pipeline in which a leak exists is first dried internally by passing a stream of dry gas such as nitrogen therethrough. The sealant composition is then fed in a suitable gas vehicle through this section of the pipeline for a sufficient time until the leak is sealed. The sealant compositions of the present invention upon escape from leaks in such underground pipelines react with moisture and oxygen present at the situs of the leak to form a solid complex reaction product and at the same time the adjacent soil provides a reinforcing matrix for the seal. Such seals are impervious to fuel gas and are strong enough to withstand high pressures.

Inasmuch as the sealants which are used in the present invention react with oxygen and/or moisture in the air when they initially escape from any existing leaks in a vessel they produce a visible smoke which serves to locate the situs of the leak. After a lapse of time the leak is sealed as previously explained, but if the seal is broken again it will be automatically resealed if the sealant is present in the interior of the vessel. In the case of systems and pipelines which convey a stream of fluid a selected sealant may be supplied to the stream at all times in suitable concentrations so that any leaks which may develop will be automatically sealed when the sealant escapes.

What is claimed is:

1. A sealant composition adapted for sealing a leak in a vessel upon escape therefrom into the ambient environment consisting essentially of a mixture of (1) a volatilizable pyrophoric trialkylaluminum alkyletherate wherein the alkyl is a straight or branched chain alkyl hydrocarbon having one to four carbon atoms, and (2) a volatilizable organo-silane compound capable of reacting with said trialkylaluminum alkyletherate to form a complex solid reaction product which seals the leak and having the formula $R_{4-n}Si(OR')_{n'}$ wherein R and R' is a straight or branched chain alkyl hydrocarbon having one to four carbon atoms, the alkyls being identical or different, and $n$ and $n'$ is an integer from 1 to 4, the proportion of trialkyaluminum alkyletherate to organosilane compound ranging from about 1 percent to about 99 percent by volume.

2. A sealant composition for sealing a leak in a vessel as defined in claim 1 wherein the alkyl etherate compound is selected from the group consisting of trimethylaluminum dimethyletherate, trimethylaluminum diethyletherate, triethylaluminum diethyletherate, tripropylaluminum diethyletherate and tri-i-butylaluminum diethyletherate.

3. A sealant composition for sealing a leak in a vessel as defined in claim 1 wherein the volatilized organo-silane compound is selected from the group consisting of trimethyl ethoxy silane, isopropyl trimethoxy silane, butyl trimethoxy silane, dimethyl diethoxy silane, propyl trimethoxy silane, diisopropoxy dimethoxy silane, and tetraethoxysilane.

4. The sealant composition of claim 1 which further includes a vehicle gas inert thereto, the proportion of active ingredients ranging from about 0.005 percent to about 10 percent by weight of said vehicle gas.

* * * * *